April 28, 1942.  M. LEICHSENRING, JR  2,281,538
MEANS FOR AND METHOD OF ADJUSTING PRESSURE FLUID BRAKE SYSTEMS
Filed Sept. 28, 1939  2 Sheets-Sheet 1

INVENTOR
Max Leichsenring Jr.
By Parker, Carlson, Pitzner & Hubbard
ATTORNEYS

April 28, 1942.   M. LEICHSENRING, JR   2,281,538
MEANS FOR AND METHOD OF ADJUSTING PRESSURE FLUID BRAKE SYSTEMS
Filed Sept. 28, 1939   2 Sheets-Sheet 2
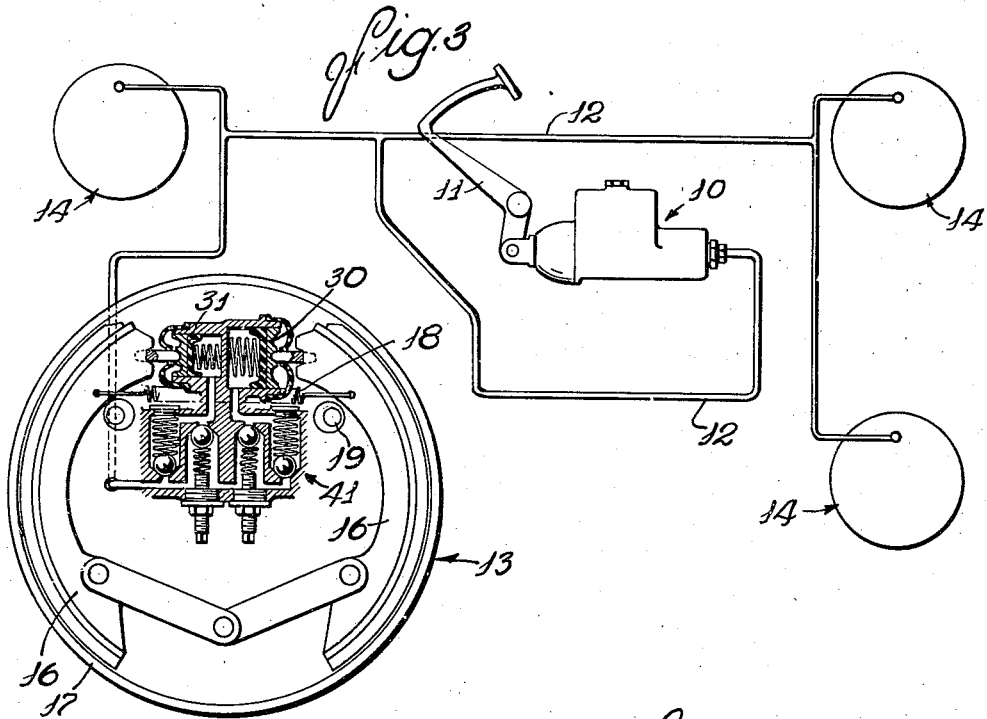
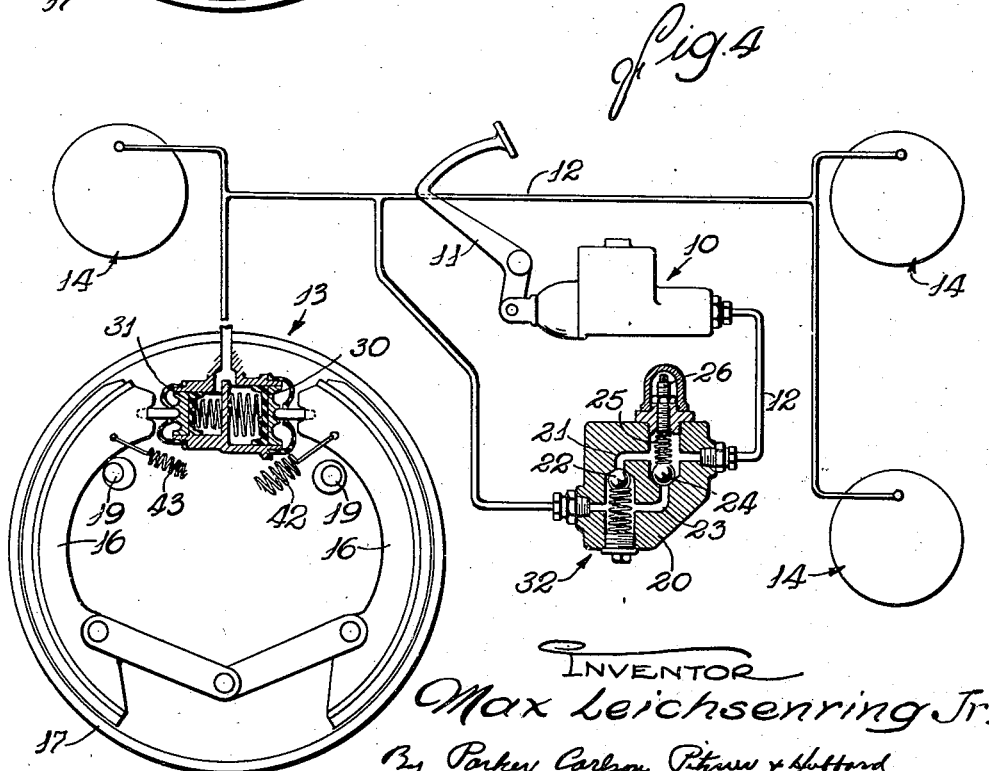
INVENTOR
Max Leichsenring Jr.
By Parker, Carlson, Pitzner & Hubbard
ATTORNEYS Patented Apr. 28, 1942

2,281,538

UNITED STATES PATENT OFFICE 2,281,538

MEANS FOR AND METHOD OF ADJUSTING PRESSURE FLUID BRAKE SYSTEMS

Max Leichsenring, Jr., Chicago, Ill.

Application September 28, 1939, Serial No. 296,900

11 Claims. (Cl. 188—152)

The invention relates to means for and method of adjusting pressure fluid brake systems and has as its general aim the provision of a new and improved means and method by which the initial adjustment may be quickly and accurately made and thereafter maintained.

An object of the invention is to provide novel means for adjusting the braking elements of a pressure fluid brake system and thereafter maintaining them in such condition regardless of variations in the operating relationships of the brake elements during use or because of wear.

Stated more specifically an object is to provide new and improved means for maintaining the brake elements in positions of adjustment by pressure fluid limited to exert a force which will hold the elements at or just away from a position of barely detectable contact.

Another object is to provide a novel method of adjusting and maintaining adjusted the brake elements in a pressure fluid system by holding the movable brake element in a predetermined position with respect to its associated element by the force of applied pressure fluid.

Other objects and advantages will become apparent in the following description and from the accompanying drawings in which:

Figs. 2, 3 and 4 are diagrammatic views of modified systems also embodying the invention.

Figure 1:
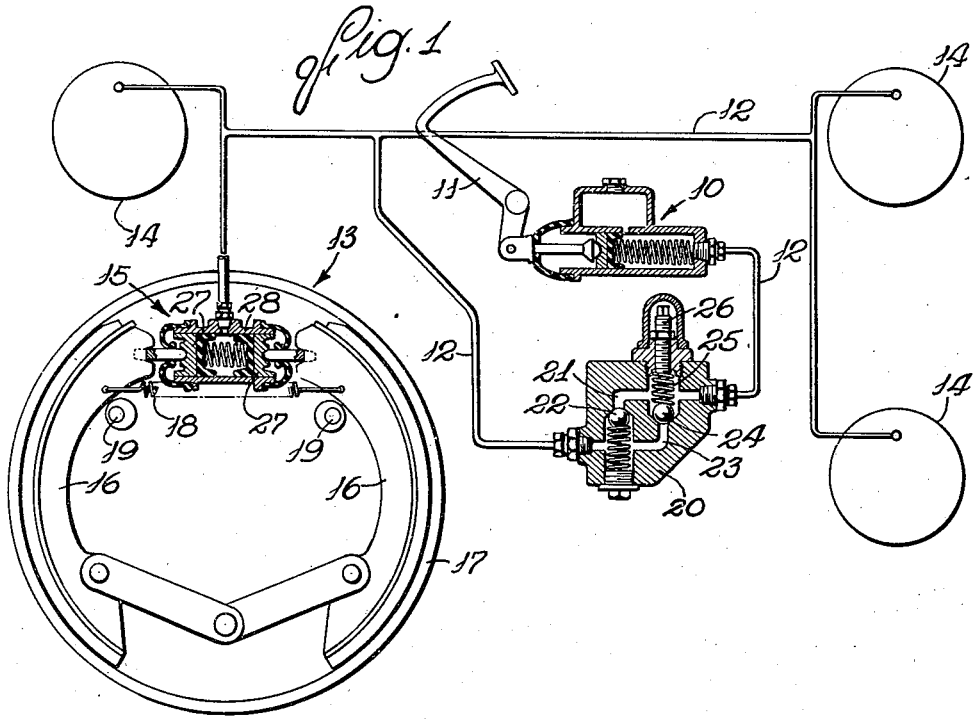
Figure 1 is a diagrammatic view of a pressure fluid brake system illustrating and embodying the features of this invention.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

Conventional forms of pressure fluid brake systems, adapted primarily for use in motor vehicles, are diagrammatically illustrated in the drawings as being representative of such systems generally. The present invention, as will become evident, may be used in connection with other systems than those shown. These systems embody generally a master pressure fluid cylinder 10 connected for manual actuation by the brake pedal 11 to place fluid under pressure and distribute it through a system of conduits 12 to the brake means 13 at the several wheels 14. The brake means usually includes pressure fluid responsive means 15 effective to move a pair of brake elements or shoes 16 into engagement with a brake drum 17 against the force of return springs 18. Such means as cams 19 limit the extent of return movement of the brake elements and these cams or stops may be considered representative of the means by which the brakes have heretofore been adjusted.

It has been the practice to adjust the brakes by adjusting the several stops until the brake elements would engage their cooperating elements simultaneously and with equal application of braking forces at the wheels. Through adjustment of the stops, the retracted positions of the brake shoes have previously been fixed so that the shoes were out of engagement with the brake drums even when the brake elements were expanded after continued use. An appreciable clearance between the brake shoes and drums resulted and wear of the brake elements required readjustment to reduce the additional clearance or to synchronize again the operation of the brake elements at the several wheels.

The present invention overcomes the difficulties inherent in brake systems of the character indicated by determining the retracted position limits of the brake shoes by means of pressure fluid applied through the system, preferably by trapping fluid therein under a predetermined maximum pressure. The amount of pressure required will depend on the characteristics of the particular system but may be defined generally as being the pressure necessary to maintain a positional relation between the brake elements such that the brake shoe is barely in engagement with the brake drum or just barely out of contact. In other words the brake elements are just at the threshold of engagement. The engagement is not a braking one, will not impair vehicle performance to any noticeable extent and will not appreciably increase brake wear, and may be termed a condition of slight or barely detectable drag.

Referring more particularly to Fig. 1 of the drawings, the numeral 20 designates a valve casing having a passageway 21 therein, which is connected in interposed relation to the conduit 12 near the master cylinder. The passageway is controlled by an adjustable spring pressed check valve 22 arranged to permit a flow from the master cylinder to the brake means but to prevent a return flow. A by-pass 23 around the check valve 22 is controlled by a reversely arranged check valve 24 urged against its seat by a spring 25 having tension adjusting means 26 associated therewith. The check valve 24 permits the return of pressure fluid to the master cylinder when the brake pedal is released except for a limited amount as determined by the force exerted by the spring 25 to hold the valve seated. This fluid trapped by the valve 24 acts on the pistons 27 in the cylinders 28 to hold the brake shoes of each brake means in the desired relation to the brake drums.

To adjust the brakes, the brake shoes are preferably brought to a position of approximate adjustment in the usual manner by the cams 19 but this setting need not be accurate in the sense required of a final adjustment. The brakes are then applied and the compression of the check valve spring 25 increased until the check valve 24 traps sufficient fluid to hold the brakes actually applied. The spring force is then diminished until the brake shoes engage the drums with a barely detectable drag. If desired, the force may be further diminished but preferably only to a slight extent. The brakes in this condition are adjusted.

With the brakes adjusted as described, the force of the trapped pressure fluid is exerted equally against each brake means and as wear occurs (either evenly or unevenly) on the brake elements the relation will be preserved. This is believed to be due to the fact that the limit position of each brake shoe is determined by a balance between the trapped pressure fluid, on the one hand, and the releasing forces of the return springs and the reacting forces set up when the brake elements are engaged, on the other hand. Once this balance has been determined by the initial adjustment, it will not be affected by subsequent changes in the brake elements due, for example, to wear. To put it another way, the extent of release of the brake elements is determined by pressure rather than by a fixed displacement or distance of movement, and wear of the parts will not effect this pressure as contrasted with its effect on clearance when a mechanical stop is used.

Preferably the brakes are initially adjusted when cold so that the drag condition will be ascertained when the brake elements are contracted. It is immaterial that expansion because of friction created heat will change the brake element relationship, since any change which will tend to cause brake engagement will only react against the holding force of the trapped pressure fluid and discharge any excess through the check valve. A change of the relationship in the other direction is equally immaterial since the brake elements contract on cooling following use and will merely separate slightly out of their barely dragging condition. In operation, this slightly separated condition will be the usual one due to the fact that the brakes cool more or less after each use and the bare dragging relation is assumed when the brakes are at peak temperature. However, the first application of the brakes thereafter will recharge the line ahead of the check valve with the amount of additional fluid required to reestablish the balance.

Figure 2:
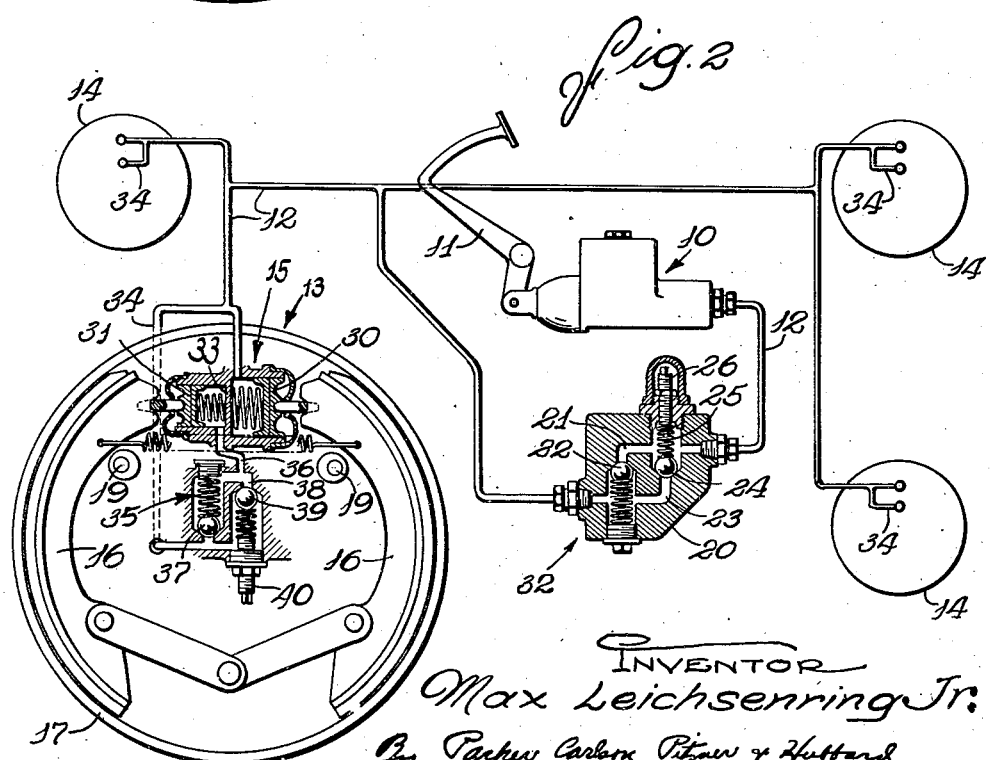

The systems shown in Figs. 2 to 4 inclusive are modifications of the system shown in Fig. 1.

Referring to Fig. 2, the type of pressure fluid responsive means 15 illustrated therein includes differential pressure pistons 30, 31 arranged to exert a greater force on one brake shoe than on the other brake shoe. In this system, trapped pressure fluid is balanced against each piston. Thus, against each larger piston (herein designated 30) the pressure fluid will be retained under predetermined maximum pressure by the valve arrangement, designated 32, and conforming essentially to that of the system shown in Fig. 1. Between the cylinders for the large and small pistons 30, 31 is a partition 33 and a branch line 34 leads from the main conduit 12 to the small cylinder. Interposed in this line is a valve assembly 35 similar to the one previously described and including an inlet passage 36 controlled by a check valve 37 and a by-pass 38 having a fluid trapping check valve 39 thereon. The latter valve is adjustable by the adjusting screw 40 to balance the trapped pressure against the return forces acting on the brake shoe which is associated with the smaller piston. The adjustment procedure previously explained is applicable to this system except that it will be necessary to adjust the tension on the valves 39 at each brake means.

As a variant of the system shown in Fig. 2 each large piston and cylinder may also have a valve assembly connected therewith as shown in Fig. 3. One valve assembly controlling the fluid flow through a large cylinder is designated 41 and since the assembly is like those previously described no further discussion is deemed necessary. In this system each trapping valve will be individually adjusted to confine the proper pressure fluid force operatively against the associated piston.

In Fig. 4 the fluid pressure confined in the system is determined by a single valve as in the system shown in Fig. 1. Compensation for the differential resulting from different sized pistons is made by adjusting the force exerted by the return springs. Thus the return spring 42 which acts on the brake shoe to which the larger piston is connected is heavier than the return spring 43 on the opposite brake shoe. Should it be desired to maintain only one of the brake shoes in an adjusted position determined by the force of the retained pressure fluid, a single return spring, such as the spring 18 in Fig. 1, would be employed in which case the brake shoe actuated by the larger piston in the cylinder 30 would be the adjusted brake shoe. To adjust these systems the procedure described in connection with the first system (Fig. 1) would be followed.

It should be noted that the systems embodying my invention do not require the cam or other adjustment stop now used, but on the other hand my systems do not require removal of these stops. The cams may, therefore, serve in connection with my invention as safety means which permit the brakes to be used as at present should an emergency arise through valve failure.

I claim as my invention:

1. The method of adjusting the individual braking elements of a pressure fluid brake system which includes the step of confining against release pressure fluid in the system to place each of said elements in brake-applying condition, and reducing the pressure until each brake element is maintained at the threshold of brake application, the braking force exerted being not substantially greater than a barely detectable drag.

2. A system of the type described, comprising a movable brake element yieldably biased toward released position, and fluid pressure actuated means for moving said element to engage a coacting element, characterized by the provision of adjustable means applying a predetermined fluid force to said element for limiting the releasing movement of said element, and means for relieving such fluid force in excess of the predetermined amount as may result from a change in the operating condition of the coacting elements.

3. In a system of the type described, the combination with movable brake element, means for urging said element toward an inoperative position, and fluid pressure responsive means for actuating said element, of means operable alternatively to supply fluid to said responsive means to move said element into braking position and to supply pressure fluid to said responsive means at a relatively lower pressure to retain said element in brake-released position but at the threshold of engagement, and adjustable means for balancing said relatively lower pressure against the restoring force exerted on said element by the urging means.

4. In fluid pressure brake mechanism, the combination of pressure fluid responsive brake means, manually manipulable means for subjecting said brake means to pressure fluid, and adjustable valve means independent of said manipulable means for maintaining said brake means when the latter is at rest constantly under a limited pressure fluid force sufficient to hold the brake means in a condition in which the brake elements are no more than lightly engaged.

5. A pressure fluid brake system having, in combination, brake means responsive to the force of pressure fluid, manually controlled means for placing fluid under pressure, a flow system for conducting pressure fluid between said manually controlled means and said brake means, valve means in said system for preventing a return flow of pressure fluid from said brake means and including means for adjustably limiting the force of the retained pressure fluid to a valve which will hold the brakes applied in no more than a light drag condition.

6. A pressure fluid brake system having, in combination, brake means including engageable braking elements, actuating means operatively responsive to the force of pressure fluid, return means for relatively moving the braking elements to an inoperative position, and means for conducting pressure fluid to said actuating means including adjustable check valve means for preventing the full release of pressure fluid from said actuating means, the force of the confined pressure fluid being balanced in opposition to the force of the return means to permit substantially complete disengagement of said brake elements and prevent complete separation substantially beyond the threshold of engagement.

7. A pressure fluid actuated brake system having, in combination, brake mechanism including a plurality of braking elements relatively movable into and out of operative engagement, pressure fluid responsive means for moving said elements into engagement, means for applying pressure fluid to said responsive means, return means for moving said elements out of operative engagement when the pressure fluid is released therefrom, and individually adjustable check valve means for each braking element adjusted to confine pressure fluid operatively against said responsive means, the force of the confined pressure fluid being limited by the adjustment of said check valve means to hold the brake elements in approximately a barely applied condition against the force of the return means.

8. A pressure fluid actuated brake system having, in combination, a brake mechanism including a plurality of braking elements relatively movable into and out of operative engagement, pressure fluid responsive means for moving said elements into engagement, return means for moving said elements out of operative engagement when the pressure fluid is released therefrom, means for conducting pressure fluid to and from said responsive means, and check valve means interposed in said last named means and adjustable to prevent a return flow of sufficient fluid from said pressure responsive means to hold the brake elements in approximately a barely applied condition against the force of the return means.

9. In pressure fluid actuated brake mechanism for motor vehicles and the like, the combination of a plurality of movable brake elements for each brake device, fluid pressure actuated means for said elements arranged to exert different pressures on each element so that each element has an individual brake applying action, and means for restraining the releasing movement of each of said elements including means for applying a predetermined pressure fluid force individually to each element for limiting its releasing movement.

10. A pressure fluid brake system having, in combination, brake means responsive to the force of pressure fluid, manually controlled means for placing fluid under pressure, a flow system for conducting pressure fluid between said manually controlled means and said brake means, stop means for determining the extent of complete retraction of said brake means, and adjustable valve means in said system operative after manipulation of said manually controlled means has been discontinued to retain pressure fluid in said system exerting a force on said brake means ample to maintain said brake means spaced from said stop means in a brake applying direction.

11. In pressure fluid actuated brake mechanism the combination of a braking system including movable braking means adapted for actuation into engagement with coacting means by the force of pressure fluid, means for subjecting said movable means to the force of pressure fluid, check means for preventing under any condition the complete release from said movable means of the force of pressure fluid, and means for predetermining the force of the pressure fluid which is retained by said check means to act on said movable means to a value which will hold said movable means just at the threshold of engagement with said coacting element when said movable means and coacting means are at normal atmospheric temperature, said check means being adapted to relieve force in excess of the predetermined value produced as a result of an increase in temperature of said movable means and coacting means, and the force of the pressure fluid retained by said check means being upon subsequent application of pressure fluid to said movable means restored to its predetermined value from a lesser value resulting from a diminution in the temperature of the moving means and coacting element.

MAX LEICHSENRING, Jr.